Aug. 2, 1927.

H. E. FOX 1,637,813

RECIPROCATING ELECTRIC MOTOR

Filed Nov. 21, 1923

INVENTOR
Harold E. Fox
by J. E. Foster
his Attorney.

Patented Aug. 2, 1927.

1,637,813

UNITED STATES PATENT OFFICE.

HAROLD E. FOX, OF PITTSBURGH, PENNSYLVANIA, ASSIGNOR TO NATIONAL ELECTRIC MANUFACTURING COMPANY, A CORPORATION OF DELAWARE.

RECIPROCATING ELECTRIC MOTOR.

Application filed November 21, 1923. Serial No. 676,042.

My invention relates to electric motors of the reciprocating type and particularly to motors employed as percussive tools.

One object of my invention is to provide a simplified system of control for a reciprocating motor, whereby the complete waves of an alternating current may be segregated and alternately supplied to the respective windings of the motor to operate the motor to do useful work.

Another object of my invention is to provide a control system of the above indicated character, in which a single rectifying unit is rendered operative, subject to the will of an operator, and then maintained operative by the cooperation of the hammer and the rectifying unit for the duration of a working operation.

Another object of my invention is to provide a control system for a reciprocating motor that shall require but one rectifying unit to control the operation of the motor, and thereby simplify the operation and reduce the number of parts and the cost of such a device.

In the system which I describe and claim herein as my invention, I utilize a mercury-arc rectifier provided with two anodes and dispose the respective solenoids of the motor in circuit with the respective anodes and the common cathode.

The rectifier is rendered operative by the production of an arc between the cathode and an auxiliary anode, by tilting the rectifier in the usual manner or by impressing a high voltage across the anode and the auxiliary cathode to cause a spark to pass between them. The rectifier is then operative to transmit current.

By reason of the highly inductive character of the solenoids of the motor, and the variations in the values of the impedances thereof caused by the moving core or piston, the current waves transmitted through the two current paths including the respective anodes, are extended in duration and overlap. That is, instead of each current wave being active for an interval corresponding to only 180 electrical degrees, it is active for an interval corresponding to about 270 electrical degrees, depending, more or less, upon the characteristics of the motor.

By reason of the overlapping of the currents traversing both circuits, the rectifier is maintained in an active condition by each current until the other current attains a value sufficient to sustain the operation of the rectifier.

The operation of the rectifier may thus be initiated when an operation of the motor is desired and the rectifier will be maintained in operative condition for the duration of the operating interval of the motor.

Figure 1:
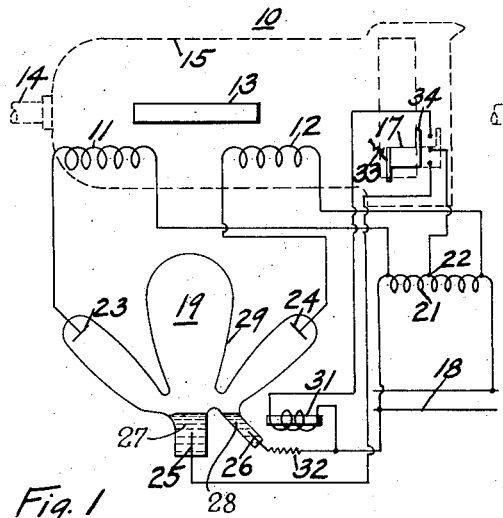
Figure 2:
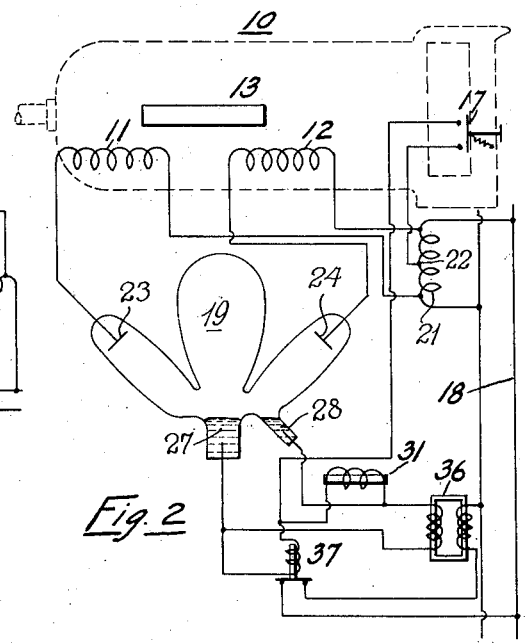

In the accompanying drawings, Figures 1 and 2, are electrical circuit diagrams of systems for controlling electric reciprocating motors in which rectifiers of the type requiring tilting for initiation are employed.

Figure 3:
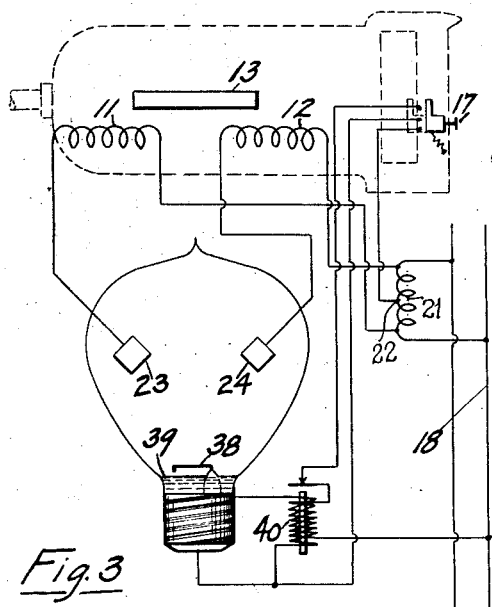
Figure 5:
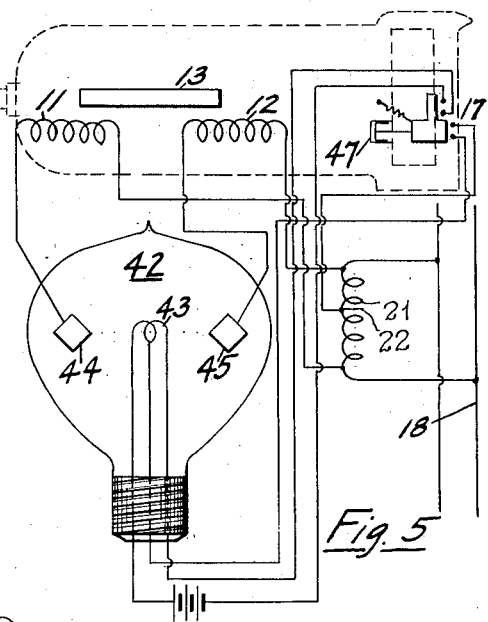
Figure 4:
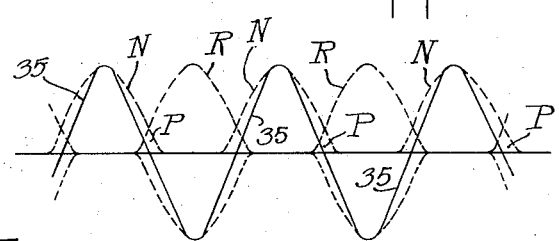

Fig. 3 is an electrical circuit diagram of a modified system in which a rectifier is employed that is rendered active by the impression of a relatively high voltage upon the anode and the auxiliary anode; Fig. 4 is an oscillogram of the current supplied to a hammer in one of the aforementioned systems; and Fig. 5 is a circuit diagram of a system similar to that in Fig. 1 except that an electronic bulb is employed.

As illustrated in the accompanying drawings, a percussive tool or hammer 10 of the reciprocating motor type, comprises, in general, two operating coils or solenoids 11 and 12, a movable core 13 controlled thereby to strike a tool 14 to do useful work, an enclosing casing 15 and a handle 16 therefor provided with a trigger switch 17 operable by the operator of the hammer.

Energy for the hammer is derived from an alternating current circuit 18, such as a commercial power and lighting circuit. This energy is controlled by an electric valve or unilateral current-conducting device 19, such as a rectifier of the mercury-arc type, and is alternately supplied to the respective operating coils 11 and 12 to effect a reciprocatory movement of the core 13.

An autotransformer 21 is employed to provide an artificial neutral point 22 but a transformer provided with separate windings may equally well be used. The autotransformer is employed because of its lesser cost.

The rectifier 19 as illustrated in Figs. 1 and 2 is of the usual form and is provided with two anodes 23 and 24, a cathode terminal 25, an auxiliary anode terminal 26 and two mercury pools 27 and 28 associated with the terminals 25 and 26, respectively, all disposed in a glass bulb 29. A tilting magnet 31 operates, when energized, to tilt the rectifier bulb 29 to effect momentary engagement between the pools 27 and 28.

When the mercury pools separate, an arc is established between them and a condition of activity established in the bulb which promotes current conduction between the cathode 25 and the anodes 23 and 24. A resistor 32 is provided in circuit with the auxiliary anode to limit the current that may traverse that circuit.

The switch 17 that is disposed in the handle 16 is of the type usually referred to as a trigger switch. It is normally biased to open position by a spring 33 and is closed and held closed by the operator when operation of the hammer is desired.

In the embodiment that is illustrated in Fig. 1, switch 17 is provided with an auxiliary contacting portion 34 whereby the tilting magnet 31 may be connected for energization, to the circuit 18 through the transformer 21.

The operation of the system shown in Fig. 1 is as follows: When the operator desires to operate the hammer 10 he closes trigger switch 17. The auxiliary portion 34 of the trigger switch 17 momentarily closes the circuit of the tilting magnet 31 and the bulb 29 is tilted to establish momentary engagement between the two mercury pools 27 and 28.

As the bulb resumes its normal position and the mercury pools separate, an arc is established therebetween. The mercury vapor produced by the arc constitutes a stream or conductor between the anode and the respective cathodes, but will only conduct current when the anode 23 or 24 is positive with respect to the cathode 25.

Since the cathode 27 is connected through switch 17 to the artificial neutral point 22, the anodes 23 and 24 will alternately be positive and negative relative thereto.

When the anode 23 is positive, current will traverse the operating coil 11 and actuate the core 13 to strike the tool 14. When the anode 24 is positive the operating coil 12 will be energized and the core 13 will be drawn away from the tool. The core 13 will thus be actuated in synchronism with the alternating current derived from the circuit.

Since the tilting magnet is only momentarily energized to establish an arc between the mercury pools, it is essential to maintain the mercury vapor stream active to obtain continued operation of the rectifier. Such activity of the vapor stream will be maintained if the current traversing the bulb is not permitted, at any time, to decrease below a predetermined value, which is the value required to sustain the vapor stream.

The inherent characteristics of the hammer are such that the currents traversing the respective operating coils 11 and 12 overlap and thereby supply the current of sustaining value necessary to sustain the vapor stream. How this effect is obtained may be seen from a consideration of Figure 4.

The solid line curve 35 may be taken for simplicity to represent the line current supplied to the transformer. The action of the rectifier 19 is to rectify the negative waves by transmitting current in one direction only. The negative waves of the line current are thus segregated by the rectifier, and, in effect, changed to positive waves, as designated by waves R in Figure 4. The waves marked N are the normal positive waves.

Due to the varying inductance of the respective operating coils 11 and 12, caused by the moving core 13, the current waves are extended over an interval of time exceeding that corresponding to 180 electrical degrees. Oscillograms of currents supplied to such hammers show the wave to subsist for an interval corresponding to about 270 electrical degrees.

Since each rectified current wave commences at the point of zero value, irrespective of an extended duration of the normal positive wave, it is apparent that the normal and the rectified waves will overlap, as illustrated at P in Fig. 4. At no time, therefore, is the current in the bulb zero. While each current wave is rising to a sustaining value, the preceding current wave sustains the vapor stream.

It is this inductive characteristic of the reciprocating motor which I have taken advantage of to sustain the operation of a rectifier of the mercury-arc type.

It should be understood that my invention is not limited to the use of a mercury-arc rectifier. Any rectifier which requires the establishment of an active condition and can then sustain its active condition by the transmitted current, may be used in place of the mercury-arc rectifier.

For example, in a thermionic valve of the two-element type, after the filament is heated and the required active condition established, the heating circuit for the filament may be disconnected, but the transmitted current will sustain the operative condition of activity. Such condition of activity will thus be sustained even in a two-element bulb where there is no overlapping current, by reason of the time element required for the filament to cool sufficiently to become non-effective as a source of a conducting electronic stream. If, therefore, two plates be provided in a bulb with a filament, the condition of activity will be sustained irrespective of overlapping currents.

In the modification that is illustrated in Fig. 2, a transformer 36 is provided to energize the tilting magnet 31, and a current relay 37 is provided to disconnect the transformer and the tilting magnet from the energizing current 18 when current traverses the rectifier 19 and the hammer 10. The current relay 37 is energized by the current traversing the cathode 27 and operates to open the circuit of the primary winding of the transformer.

In the system that is illustrated in Fig. 5, an electronic bulb 42 is employed that is provided with a filament cathode 43 and two plates or anodes 44 and 45. A battery 46 for heating the filament 43 is disconnected by the trigger switch 17 after the filament is heated. A dashpot 47 is schematically shown on the switch 17 to indicate a time interval in the switch operation to permit the filament to become heated.

In the modification that is illustrated in Fig. 3, the rectifier is of the type that may be threaded into a socket. The auxiliary anode 38 constitutes a pointed metal terminal disposed adjacent the surface of a mercury pool 39 constituting the cathode.

In order to establish a condition of activity in the rectifier, an induction coil 40 is provided to produce a spark between the anode 38 and the cathode 39. The induction coil 40 is momentarily energized by the trigger switch 17, similarly to the operation in Fig. 1.

My invention therefore comprehends the method of operating an electric motor of the reciprocating type, by establishing an active condition in a rectifier and then sustaining such condition by the operating current of the motor to control the energization of the motor; and it comprehends further the specific means, particularly a rectifier of the mercury-arc type, whereby such operation and control may be effected.

My invention is not limited to the particular construction or arrangement of the elements as shown which may be modified without departing from the spirit and scope of the invention as set forth in the appended claims.

I claim as my invention—

1. The combination with a source of alternating current, of a reciprocating motor comprising a field-producing winding and a reciprocating member controlled thereby, a rectifier in circuit with said source and said winding, means for rendering said rectifier active, and switching mechanism carried by said motor controlling said means to start said rectifier and controlling the circuit of said winding and rectifier.

2. The combination with a source of alternating current, of a reciprocating motor comprising a field-producing winding and a reciprocating member controlled thereby, a rectifier in circuit with said source and said winding, means for rendering said rectifier active, and a control switch carried by said motor and serving when operated momentarily to control said means to start said rectifier and thereafter to close the circuit of said winding and rectifier.

3. In combination, an electric hammer of the reciprocating motor type embodying two operating coils and a switch subject to the will of an operator for controlling the operation of the hammer, a mercury-arc rectifier provided with two anodes, a cathode and an auxiliary starting anode, a tilting device for the rectifier, a transformer for supplying energy to the tilting device and to the rectifier for translation to the hammer, means whereby the operator's switch controls the tilting device, and means connecting each operating coil between one anode and one terminal of the transformer.

4. The combination with an electric motor of the reciprocating type provided with two operating coils, and a source of alternating current, of a unit rectifier comprising means constituting two unilateral current-conducting circuits, means for initiating a state of activity in the rectifier and means connecting the operating coils in said circuits whereby the inductive character of the respective operating coils serves to maintain the state of activity in the rectifier until current traverses the other current-conducting circuit.

5. The combination with an electric motor of the reciprocating type provided with two operating coils, and a source of alternating current, of a unit rectifier for controlling the alternate energization of the coils from said source, means energized from said source for initiating a condition of activity in the rectifier and means whereby said initiating means are then rendered ineffective so long as the condition of activity is sustained by current traversing the rectifier from said source.

6. The combination with an electric hammer of the reciprocating motor type provided with an operating switch and a source of single phase current, of a rectifying device for automatically supplying current impulses to the hammer, means controlled by said switch for rendering the device operative, and means dependent upon the continuous operation of the rectifying device for subsequently rendering the switch-controlled means non-operative.

7. The combination with an electric hammer of the reciprocating motor type provided with an operating switch and a source of single phase current, of a rectifying device requiring an initial state of activity for the proper operation thereof, means controlled by the operating switch for establishing a state of activity in the rectifying device by energy derived from said source, and means for rendering the activity-establishing means ineffective when the current traversing the rectifying device operates to sustain the initiated state of activity.

8. The combination with a source of alternating current, of a reciprocating motor comprising a field-producing winding and a reciprocating member controlled thereby, a rectifier in circuit with said source and said winding, means for rendering said rectifier active, a switch controlling said means, a switch carried by said motor controlling the circuit of said winding and said rectifier, and a coil in said circuit controlling said first named switch and controlled by said second named switch.

9. The combination with a source of alternating current, of a reciprocating motor comprising a plurality of operating coils and a reciprocating magnetic member, a rectifier of the mercury type having a pair of anodes connected, respectively, in the circuits of said operating coils and said source, means for starting said rectifier, and a switch carried by said motor controlling said means and the circuits of said rectifier and said operating coils, said rectifier maintained active after cessation of control of said starting means by said switch by impulses traversing the respective anodes of said rectifier and caused to overlap each other by the inductance of said operating coils as affected by movement of said reciprocating member.

10. The combination with a source of alternating current, of a reciprocating motor comprising a plurality of operating coils and a magnetic member moved thereby, and a rectifier of the mercury type having a pair of anodes connected, respectively, in the circuits of said operating coils and said source, said rectifier maintained active by application of electro-motive-force of said source to the circuit of one of the anodes before cessation of a current impulse through the other of said anodes.

In testimony whereof, I have hereunto subscribed my name this 17 day of November, 1923.

HAROLD E. FOX.